United States Patent [19]
Chen

[11] Patent Number: 5,189,515
[45] Date of Patent: Feb. 23, 1993

[54] TELEVISION SYNCHRONIZATION SIGNAL SEPARATOR

[75] Inventor: Yen-Chen Chen, Hsichu, Taiwan

[73] Assignee: Industrial Technology Research Institute, Hsinchu, Taiwan

[21] Appl. No.: 650,197

[22] Filed: Feb. 4, 1991

[51] Int. Cl.$^5$ .............................................. H04N 5/08
[52] U.S. Cl. .................................. 358/157; 358/155; 358/154; 358/150; 358/153
[58] Field of Search ............... 358/150, 153, 154, 155, 358/148, 149, 152, 151, 159, 157, 176, 177

[56] References Cited
U.S. PATENT DOCUMENTS 4,827,341  5/1989  Akimoto ............................ 358/148
4,837,626  6/1989  Nishiyama ......................... 358/153

Primary Examiner—James J. Groody
Assistant Examiner—Sherrie Hsia
Attorney, Agent, or Firm—H. C. Lin

[57] ABSTRACT

A television synchronization signal separator for a composite synchronizating signal, in which the horizontal synchronizing signal and the vertical synchronizing signals are derived and free from the interference of the equalization signals and noise during the vertical synchronization period. The odd and even fields are detected for generating the vertical synchronizing signal. All the circuits used are of digital types, so that they can be fabricated in an integrated structure.

6 Claims, 4 Drawing Sheets

TELEVISION SYNCHRONIZATION SIGNAL SEPARATOR

BACKGROUND

This invention is generally related to television synchronization.

In a television system, the picture is produced on a screen by scanning the video signal in time sequence both in the horizontal direction as lines and the vertical direction as fields. The horizontal lines move progressly in the vertical direction like a sawtooth. The reconstruction of the picture requires that the television signal contains horizontal synchronization signal (sync) to control the timing of the retrace of the horizontal scanning lines, and vertical sync signal to control the resetting of the horizontal lines to the top of the screen after the scanning lines reach the bottom of the screen to complete one vertical field.

The scanning lines are interlaced in that the horizontal lines of one field are interposed between the scanning lines of the next field. Such interlacing reduces the flickering of the reconstructed picture.

To effect interlacing, the starting position of the first horizontal scan of one field must be offset by half a scan line from that of the next field. To start the two horizontal scan lines at different points along the horizontal direction, equalization pulses are introduced in the synchronization signals. These equalization pulses usually consist of pulses of double the horizontal sync signal frequency and of different pulse width from the horizontal sync pulses as shown in FIG. 1. In this figure, the p, q, r intervals contain the equalization pulses. The s interval contains the video signal, lying between the horizontal sync pulses.

Thus a video signal must include horizontal sync pulses, vertical field sync pulses and equalization pulses. Such a signal is known as a composite sync signal, indicated as period t in FIG. 1.

A conventional television receiver usually has a horizontal oscillator to generate scanning signals and a vertical oscillator to generate field scanning signals. These oscillators usually contain large value capacitors, which are not suitable for integrated circuits.

Ikeda disclosed in U.S. Pat. No. 4,393,405 a method, whereby both the horizontal and vertical scanning signals are derived from a single oscillator. Ikeda obtains the horizontal and vertical scanning signals by dividing a high frequency signal from a voltage controlled oscillator, which is locked in by the horizontal sync signal in a phase locked loop. However Ikeda's system has several drawbacks:

1) Ikeda uses an integrator to obtain a vertical sync signal from the higher frequency horizontal sync signal. The integrator requires long time constant resistor and capacitor which cannot be integrated.

2) Ikeda's system has no provision for detecting the even or odd field, while conventional even/odd field detecting method consists of monostable multivibrator or differentiating circuits. In either case, long time constant resistors and capacitors are required and are impractical to integrate. Without even/odd field detection, interlacing cannot be implemented.

3) Ikeda's system obtains the horizontal and vertical sync signals using only one voltage controlled oscillator in a phase-locked loop to lock in the different sync frequencies with the horizontal sync signal. Since the equalization pulses are present during the vertical synchronization period and have a different frequency and pulse width from the horizontal sync signals, the equalization pulses may prevent the phase-locked loop from locking in or to be immune from noise.

Therefore, the Ikeda's system leaves something to be desired. A need exists to correct the shortcomings of Ikeda's system.

SUMMARY

An object of this invention is to process a composite synchronizing signals, which include horizontal sync pulses, vertical sync pulses and equalization pulses for a television receiver. Another object of this invention is to derive from incoming video signals all the required synchronizing pulses for a television receiver, including means to detect odd or even field with circuits which are totally integrable. A further object of this invention is to provide a circuit for television receiver which is free from the interference of the equalization pulses or external noise. Still another object of this invention is to provide an integrated circuit for processing television synchronizing signals digitally, so as to achieve small size, low power and low cost.

These objects are achieved in this invention by using a phase-locked loop with a voltage controlled oscillator (VCO) operating at a high frequency which is a multiple of the horizontal sync frequency. The horizontal and vertical scanning signals are counted down from this high frequency signal. All the signals are processed digitally, thereby eliminating the use of large value capacitors for integrators and differentiators. These digital circuits include counters, decoders and flip-flops which can all be integrated. The equalization pulses and noise are eliminated from the horizontal sync pulses during the vertical synchronization period, thereby improving the lock-in property of the phase-locked loop. Odd and even field signals are detected and used for generating proper scanning signals for interlacing.

DETAILED DESCRIPTION OF THE PREFERRED EMBODIMENT

Figure 2:
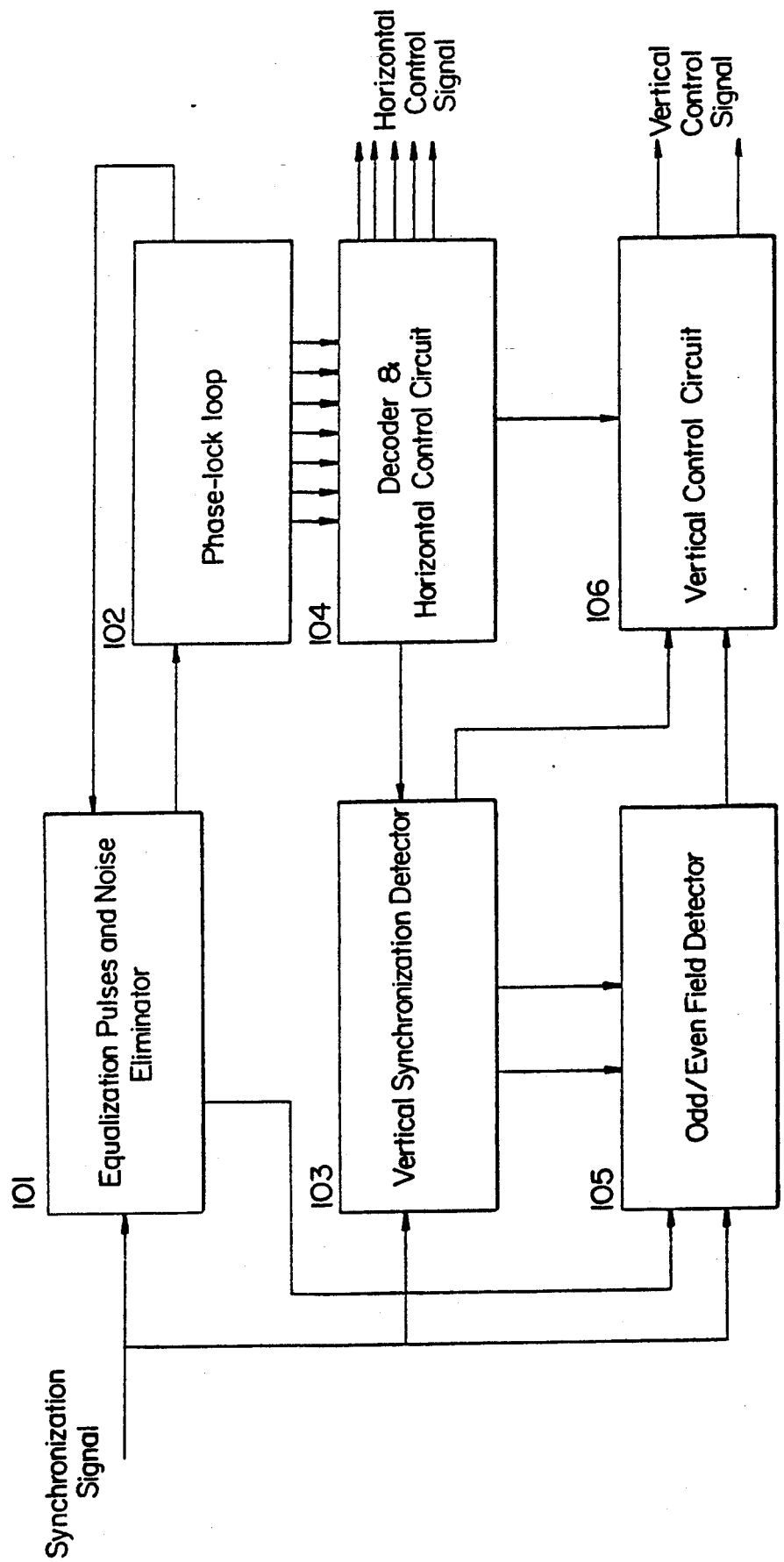
FIG. 2 shows the block diagram of the present invention.

FIG. 2 shows the block diagram of this invention. There are an equalization pulse and noise eliminator 101, a phase-locked loop 102, a vertical synchronization detector 103, a decoder horizontal control circuit 104, an odd/even field detector 105 and a vertical control circuit 106.

The equalization pulse and noise eliminator eliminates, during the vertical synchronization period, the equalization pulses and noise, which have different frequencies from the horizontal sync signals. Thus, only a horizontal sync frequency signal appears at the output of the eliminator 101.

The horizontal sync frequency signal from block 101 is then applied to the phase locked loop 102 to lock in the much higher frequency signal generated by the voltage controlled oscillator (VCO) of the phase-locked loop.

The high frequency signal generated by the VCO in the phase locked loop 102 is divided down and fed to the horizontal control circuit 104. The horizontal control (scanning) signal is then generated from this horizontal control circuit. The vertical synchronization signal generator 103 is used to detect the vertical synchronization signal from the composite sync signal. This composite sync signal is supplied to the odd/even field detector 105 for odd/even field detection. The output of this odd/even field detector 105, together with the vertical sync signal generated from the generator 103 and a control signal generated from the decoder 104, is used to control the vertical control circuit 106 which generates a vertical control signal output.

Figure 1:
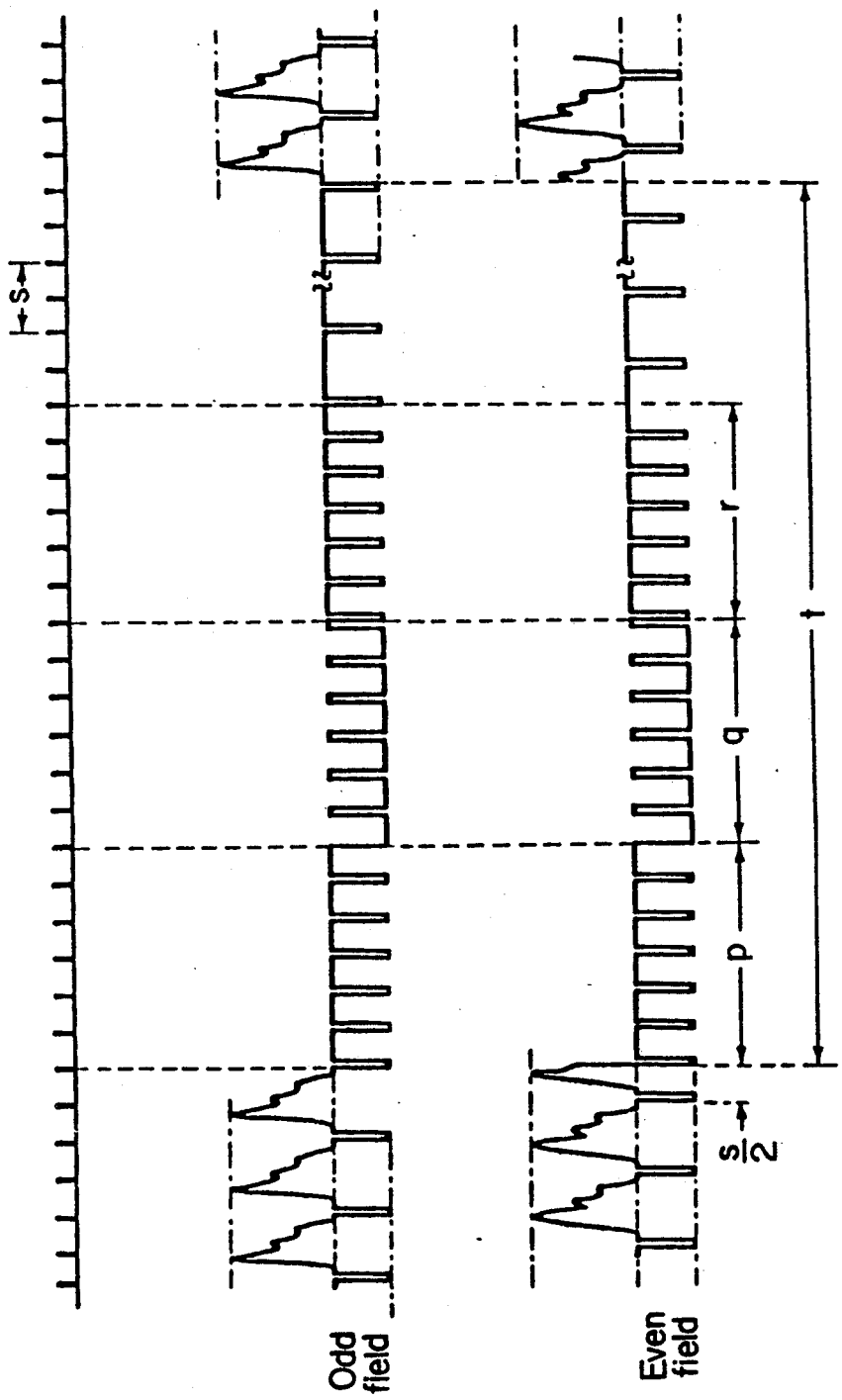
FIG. 1 shows a television signal during the vertical synchronization period.
Figure 3:
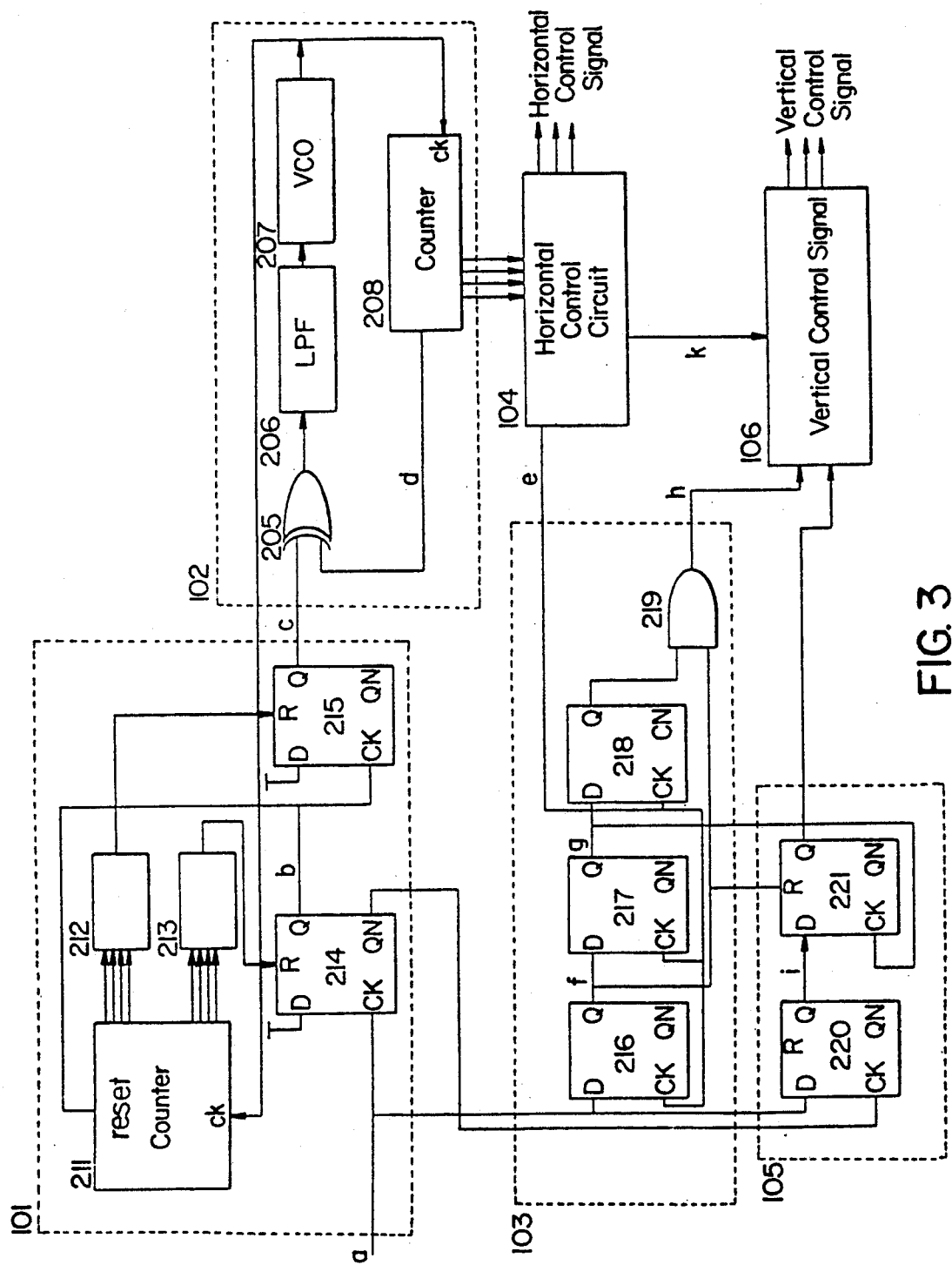
FIG. 3 shows the block diagram showing the detailed circuits of the present invention.
Figure 4:
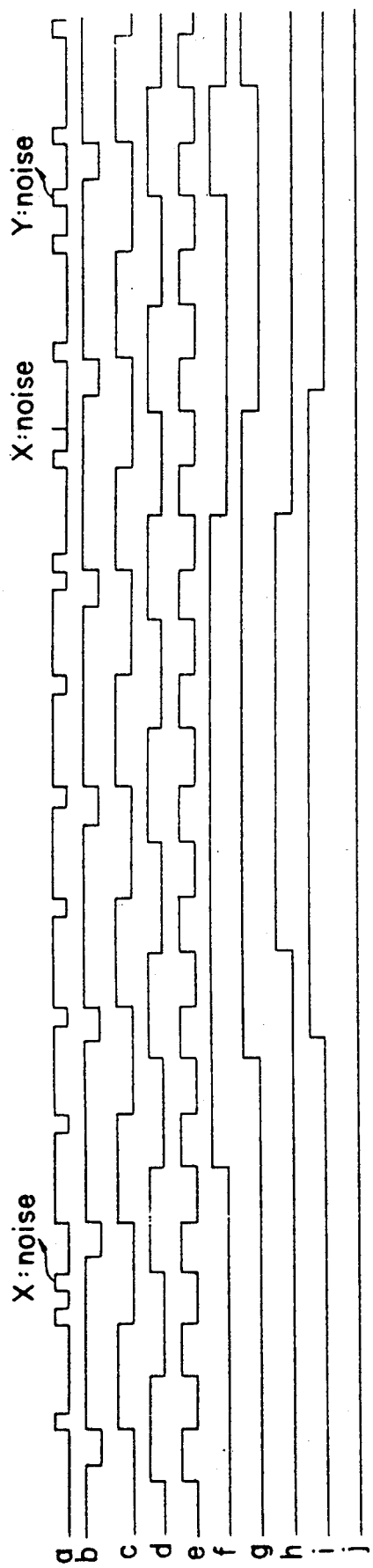
FIG. 4 shows the pulse waveforms at various points of the circuit for an odd vertical field according to this invention.
Figure 5:
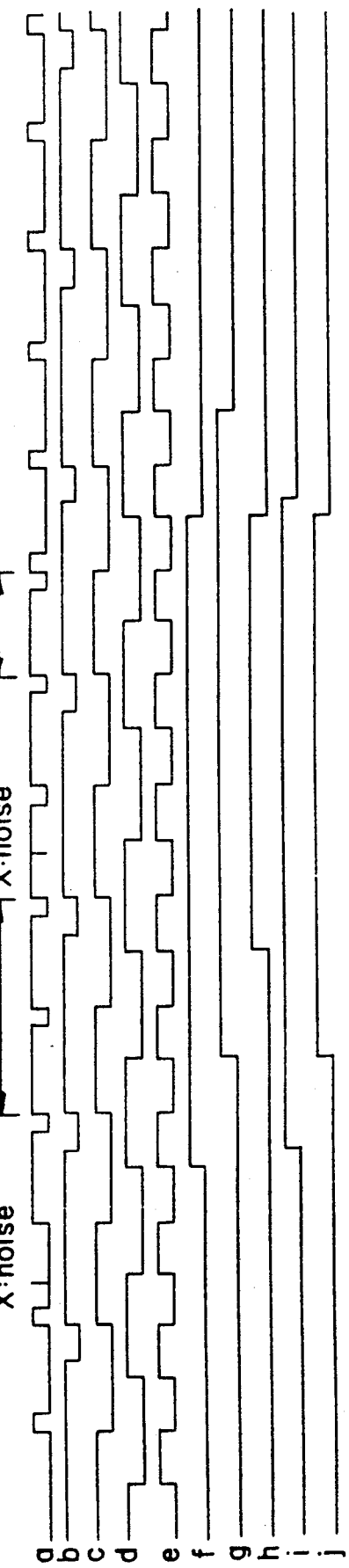
FIG. 5 shows the pulse waveforms at various points of the circuit for an even vertical field according to this invention.

The preferred circuit of this invention is shown in FIG. 3, which implements the block diagram in FIG. 2. The detailed operation of these different blocks will next be explained with the aid of FIG. 4 and FIG. 5. FIG. 4 shows the waveforms for even vertical field, and FIG. 5 shows the waveforms for odd vertical field. In these figures, the letters labeling the waveforms correspond to the letters labeling the nodes in the circuit shown in FIG. 3. A TV signal is first separated into composite synchronization pulses serving as the input synchronization signal in FIG. 1. Waveforms a in both FIG. 4 and FIG. 5 depict the equalization pulses. These equalization pulses have double the frequency of the horizontal synchronization frequency. After the equalization pulses are applied to the equalization pulses and noise eliminator 101 as a clock signal for the D-type flip-flop 214, the equalization pulse frequency is divided by 2 to obtain a horizontal sync frequency square wave as shown in waveform d, which has a 50% duty cycle. This horizontal sync frequency signal eventually locks in with the much higher frequency signal generated by the VCO of the phase-locked loop 102. The high frequency signal generated from the VCO 207 of the phase-locked loop is counted by the counter 211. When the positive edges of the synchronization signal as shown in FIG. 4 (a) and FIG. 5 (a) trigger the flip-flop 214, the Q output goes high as shown in waveform b and starts the counter 211. Flip-flop 214 is reset by a decoder 213, which decodes the count of counter 211. When the counting continues to about 85% of the duty cycle of the horizontal sweeping cycle (about 63.5 microseconds), the decoder 213 sends a negative pulse signal to reset the flip-flop 214, setting the Q output low, resetting the counter 211 back to the original state and waiting for the positive edge after next of the sync signal. The positive edge of the Q output of flip-flop 214 triggers another flip-flop 215. After decoding by the decoder 212, a negative pulse is generated at about 50% of horizontal sweeping cycle to reset the flip-flop 215. Then the waveform c appears at the Q output of flip-flop 215 and is used as the reference signal for the following phase-locked loop 102. Note that the equalization pulses are eliminated in signal b and c, which are used for other parts of the system, namely the phase-locked loop 102 and odd/even field detector 105. Besides, about 85% of any noise in the synchronization signal can be removed, for any noise in this equalization signal region such as in "X" in waveform a occurs when signal b is high and therefore cannot disturb the high state of signal b. Thus the purpose of eliminating noise is accomplished. With this arrangement of the equalization pulse eliminator 101, the horizontal sync frequency pulses are generated in spite of the presence of equalization pulses and noise.

The phase-locked loop 102 consists of an Exclusive-OR 205, a low-pass filter 206, a voltage controlled oscillator 207 and a counter 208. The counter output having the same period as the horizontal scanning period is fed back to the Exclusive OR, which serves as a phase comparator to compare with the phase of signal c. The oscillator oscillates at a frequency many time (up to 16) higher than the horizontal scanning frequency (of 15750 Hertz for NTSC system). This frequency is counted down by the counter 208. At point d in the feedback loop to the Exclusive-OR 205, the frequency is counted down to the horizontal sync frequency and locked in with signal c. Since the oscillating frequency is very high, the low pass filter 206 of the phase-locked loop can use a small RC time constant, suitable for integrated fabrication. When the c input to the Exclusive-OR 205 is out of phase with the signal at the d input, the output of the Exclusive-OR is at logic 1. When c and d are in phase, the output of the Exclusive-OR is at logic 0. Thus, the phase-locked loop is locked in when the signals c and d are in phae and out-of-phase half the time as shown in waveform d relative to waveform c.

Other outputs of the counter 208 (in binary numbers) are fed to the horizontal control circuit 104. From these outputs, a horizontal control (or scanning) signal is derived. Also derived are a square wave signal e at double the horizontal synchronization frequency and a control signal k that is fed to the vertical control circuit 106 for maintaining the timing relationship between block 104 and block 106 as required by conventional CRT horizontal and vertical control circuit.

In the vertical synchronization detector the signal e is used to clock the D flip-flops 216, 217, 218 in the vertical synchronization detector. Because of the wide pulse width of the vertical synchronization signal such as pulses 1, 2, 3 in the curves of FIG. 4 and FIG. 5, a vertical synchronization signal f is generated when incoming composite synchronizing signal a is coincident with the clock signal e. The signal f is delayed by one clock pulse e by the D-flip-flop 217 and appears as waveform g. The waveform g is delayed by another clock pulse e at the leading edge and advanced by one clock pulse e at the trailing edge as shown in waveform h through another D-flip-flop 218 and an AND gate 219. The output at h of AND gate 219 is fed to a vertical control circuit 106. The vertical synchronous separator circuit 103 uses the composite sync signal a as the data input of flip-flop 216 and is clocked by a decoded output of the horizontal control circuit, waveform e, which has a period one half of the horizontal scanning period.

The odd/even field detector consists of two D-type flip-flops 220 and 221 in cascade. The input D of the flip-flop 220 is fed from the incoming composite sync signal a and clocked by the complement of the b output from the equalization pulse and noise eliminator 101. The flip-flop 221 is clocked by signal g from the vertical synchronization signal separator 103. The signals b, c, d, i for the even field are advanced half a scan time ahead that of odd field, while signals f, g, h do not change relative timing. There is no output at the output of flip-flop 221 for odd field, but there is an output pulse j at the Q output for even field. Because the number of horizontal lines for each picture field is not an integer number (e.g. 262.5 lines per field in NTSC system), the signal b generated by the circuit in the equalization pulse elimination block 101 has different relative timing for odd and even field as shown in signal a and signal b in FIG. 4 and FIG. 5. Signal b for even field leads the signal b for odd field by half a horizontal scan time. Using the negative edge of signal b as the a trigger (clock) signal and signal a as the input to D-flip-flop 220, the waveform i is generated at the Q output of flip-flop 220. Signal i for the odd field and the even field has a difference of half a horizontal cycle. When signal g, signal i and signal f are used as trigger data and reset respectively for the flip-flop 221, the signal j is generated with a high signal for the even field and a low signal for the odd field during the vertical synchronizing period. Thus the odd or even field is determined.

When the j signal, together with signal h and a divided down signal k from the horizontal control circuit, is applied to the vertical control circuit 106, a vertical control signal is generated. The generation of a vertical control (scanning) signal synchronizing signal such as h is well-known in the art.

While this invention describes a sync signal separator for a conventional television set, it should be understood that the same system can also be applied to other television system, such as liquid crystal display system.

What is claimed is:

1. A television synchronizing signal generator for separating from a composite synchronization signal, horizontal synchronizing pulses, vertical synchronizing pulses, equilization pulses for determining even or odd field, comprising:

an equalization pulse and noise eliminator for elimating said equalization pulses from said composite synchronization signal and generating said horizontal synchronization pulses with a period equal to one horizontal scanning time;

a phase-locked loop including:
 a voltage controlled oscillator generating a high frequency signal multiple times the pulse repetition rate of said horizontal synchronization pulses,
 a first counter for generating pulses of submultiple frequency of said high frequency signal,
 a phase comparator for comparing the frequencies of said horizontal synchronization pulses derived from said equalization pulse and noise eliminator and said submultiple frequency pulses,
 a low pass filter for feeding back a dc voltage for controlling said oscillator to generate and to lock in said high frequency signal;

a horizontal control circuit for generating a horizontal scanning signal by dividing said high frequency signal;

a vertical synchronization detector which derives a vertical synchronizing signal from said composite synchronizing signal;

an even or odd field detector which detects the state of said even or odd field by deriving a signal from said composite synchronizing signal, from said equalization pulse and noise eliminator, and from said vertical synchronization detector;

a vertical control circuit for generating a scanning signal derived from said vertical synchronizing signal and the state of said even or odd field.

2. A television synchronization signal separator as described in claim 1 wherein said equalization pulse and noise eliminator comprises:

a first input terminal for inputting said composite synchronizing signal, a second input terminal for inputting said high frequency signal, a first flip-flop, whose clock input terminal is connected to said first input terminal and whose data input is connected to a high logic "1" voltage, a second flip-flop whose clock input is connected to the data output terminal of said first flip-flop, whose data input terminal is connected to said logic "1" voltage, and whose output terminal is connected to said phase-locked loop, a second counter whose clock input terminal is connected to said second input terminal, and whose reset terminal is connected to the output terminal of said first flip-flop, a first decoder whose input terminal is connected to the output terminals of said second counter, and whose output terminal is connected to the reset terminal of said second flip-flop for resetting said second flip-flop to zero output when said second counter counts up to a time equal to a preset time of said first flip-flop, a second decoder whose input terminals are connected to the outputs of said second counter and whose output terminal is connected to the reset terminal of said first flip-flop for resetting when said second counter counts up to a time equal to a preset time of said second flip-flop.

3. A television synchronization signal separator as described in claim 2, wherein said preset time for said first decoder is equal to approximately 50% of said horizontal scanning time of a television signal, and said second flip-flop is clocked by the output of said first flip-flop.

4. A television synchronization separator as described in claim 2, wherein said preset time for second decoder is equal to approximately 85% of said horizontal scanning time.

5. A television synchronization signal separator as described in claim 2, wherein said vertical synchronization detector comprises:

a third flip-flop having an input terminal connected to said composite synchronizing signal and having a clock terminal connected to a second source of periodic pulses of preset frequency, such that a wide vertical synchronization signal appears at the output terminal of said third flip-flop to avoid noise interference, a fourth flip-flop whose input in connected to the output of said third flip-flop, whose clock terminal is connected to said second source of periodic pulses, and whose output has second wide vertical synchronization signal delayed by one clock pulse from said vertical synchronization signal at the output of said third flip-flop to avoid noise interference, a fifth flip-flop whose input terminal is connected to the output terminal of said fourth flip-flop, whose clock terminal is connected to said second source of periodic pulses and whose output has a third wide vertical synchronization signal delayed by one clock pulse from the output of said fourth flip-flop to avoid noise interference, a two input AND gate, having one input connected to the output of said fifth flip-flop and second input terminal connected to the output terminal of said third flip-flop, thereby generating a fourth wide vertical synchronization signal to avoid noise interference.

6. A television synchronization signal separator as described in claim 5, wherein said odd/even detector comprises:
a sixth flip-flop whose input terminal is connected to said composite synchronizing signal and whose clock terminal is connected to the anti-phase data output terminal of said first flip-flop,
a seventh flip-flop whose input terminal is connected to the data output terminal of said sixth flip-flop, whose clock input is connected to the data output terminal of said fourth flip-flop, and whose reset terminal is connected to the data output terminal of said third flip-flop, whereby detecting an even field or odd field at the output terminal of said seventh flip-flop.

* * * * *